(12) United States Patent
Drew et al.

(10) Patent No.: US 7,303,803 B2
(45) Date of Patent: *Dec. 4, 2007

(54) COPY-PROTECTED OPTICAL MEDIA AND METHOD OF MANUFACTURE THEREOF

(75) Inventors: Jeffrey M. Drew, Darien, CT (US); Richard H. Selinfreund, Guilford, CT (US); Donald R. Goyette, Plainfield, CT (US); Rakesh Vig, Durham, CT (US)

(73) Assignee: Verification Technologies, Inc., Essex, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/000,845

(22) Filed: Dec. 1, 2004

(65) Prior Publication Data

US 2005/0153109 A1     Jul. 14, 2005

Related U.S. Application Data

(63) Continuation of application No. 10/650,319, filed on Aug. 28, 2003, now Pat. No. 6,838,145, which is a continuation of application No. 09/879,457, filed on Jun. 12, 2001, now Pat. No. 6,638,593, which is a continuation-in-part of application No. 09/821,577, filed on Mar. 29, 2001, now Pat. No. 6,589,626, which is a continuation-in-part of application No. 09/739,090, filed on Dec. 15, 2000, now abandoned, which is a continuation-in-part of application No. 09/631,585, filed on Aug. 3, 2000, and a continuation-in-part of application No. 09/608,886, filed on Jun. 30, 2000, now abandoned.

(51) Int. Cl.
*B32B 3/02* (2006.01)
(52) U.S. Cl. .................. 428/64.4; 428/195.1; 428/690; 430/270.11
(58) Field of Classification Search .................... None
See application file for complete search history.

(56) References Cited

U.S. PATENT DOCUMENTS

| 1,822,098 A | 9/1931 | Huntress |
| 2,265,196 A | 12/1941 | Riley |
| 2,521,124 A | 9/1950 | Miller |
| 3,356,462 A | 12/1967 | Cooke et al. |

(Continued)

FOREIGN PATENT DOCUMENTS

DE     2 118 928     11/1971

(Continued)

OTHER PUBLICATIONS

AOAC Official Methods of Analysis, 1900, pp. 752-754.

(Continued)

*Primary Examiner*—Bruce H. Hess
(74) *Attorney, Agent, or Firm*—Kelley Drye & Warren LLP

(57) ABSTRACT

A computer-readable medium having material at a select position therein and containing instructions for controlling an optical reader to cause the optical reader to re-read the position having the material one or more times to elicit a measurable parameter at such position.

5 Claims, 7 Drawing Sheets

U.S. PATENT DOCUMENTS

| | | |
|---|---|---|
| 3,412,245 A | 11/1968 | Halverson |
| 3,444,517 A | 5/1969 | Rabinow |
| 3,473,027 A | 10/1969 | Freeman et al. |
| 3,500,047 A | 3/1970 | Berry |
| 3,533,744 A | 10/1970 | Unger |
| 3,591,283 A | 7/1971 | Peisach |
| 3,624,644 A | 11/1971 | Higgins |
| 3,649,464 A | 3/1972 | Freeman |
| 3,662,181 A | 5/1972 | Hercher et al. |
| 3,663,813 A | 5/1972 | Shaw |
| 3,886,083 A | 5/1975 | Laxer |
| 3,928,226 A | 12/1975 | McDonough et al. |
| 3,992,158 A | 11/1976 | Przybylowicz et al. |
| 3,996,006 A | 12/1976 | Pagano |
| 4,015,131 A | 3/1977 | McDonough et al. |
| 4,018,643 A | 4/1977 | Levine |
| 4,038,151 A | 7/1977 | Fadler et al. |
| 4,053,433 A | 10/1977 | Lee |
| 4,077,845 A | 3/1978 | Johnson |
| 4,078,656 A | 3/1978 | Crane et al. |
| D248,044 S | 5/1978 | Odom, Jr. et al. |
| 4,087,332 A | 5/1978 | Hansen |
| 4,090,031 A | 5/1978 | Russell |
| 4,118,280 A | 10/1978 | Charles et al. |
| 4,146,792 A | 3/1979 | Stenzel et al. |
| 4,154,795 A | 5/1979 | Thorne |
| 4,202,491 A | 5/1980 | Suzuki |
| 4,235,964 A | 11/1980 | Bochner |
| 4,243,694 A | 1/1981 | Mansukhani |
| 4,260,392 A | 4/1981 | Lee |
| 4,329,317 A | 5/1982 | Detweiler et al. |
| 4,365,970 A | 12/1982 | Lawrence et al. |
| 4,382,064 A | 5/1983 | Detweiler et al. |
| 4,387,112 A | 6/1983 | Blach |
| 4,439,356 A | 3/1984 | Khanna et al. |
| 4,450,231 A | 5/1984 | Ozkan |
| 4,451,521 A | 5/1984 | Kaule et al. |
| 4,451,530 A | 5/1984 | Kaule et al. |
| 4,468,410 A | 8/1984 | Zeya |
| 4,485,308 A | 11/1984 | Rabatin |
| 4,486,536 A | 12/1984 | Baker et al. |
| 4,501,496 A | 2/1985 | Griffin |
| 4,514,085 A | 4/1985 | Kaye |
| 4,540,595 A | 9/1985 | Acitelli et al. |
| 4,542,288 A | 9/1985 | Drexler |
| 4,557,900 A | 12/1985 | Heitzmann |
| 4,567,370 A | 1/1986 | Falls |
| 4,577,289 A | 3/1986 | Comerford et al. |
| 4,589,551 A | 5/1986 | Hellon |
| 4,589,743 A | 5/1986 | Clegg |
| 4,598,205 A | 7/1986 | Kaule et al. |
| 4,620,776 A | 11/1986 | Ima |
| 4,631,174 A | 12/1986 | Kondo |
| 4,632,901 A | 12/1986 | Valkirs et al. |
| 4,642,526 A | 2/1987 | Hopkins |
| 4,663,518 A | 5/1987 | Borror et al. |
| 4,677,604 A | 6/1987 | Selby, III et al. |
| 4,734,796 A | 3/1988 | Grynberg et al. |
| 4,736,425 A | 4/1988 | Jalon |
| 4,746,631 A | 5/1988 | Clagett |
| 4,756,557 A | 7/1988 | Kaule et al. |
| 4,767,205 A | 8/1988 | Schwartz et al. |
| 4,789,804 A | 12/1988 | Karube et al. |
| 4,806,316 A | 2/1989 | Johnson et al. |
| 4,818,677 A | 4/1989 | Hay-Kaufman et al. |
| 4,823,210 A | 4/1989 | Bond |
| 4,849,836 A | 7/1989 | Kachikian |
| 4,858,036 A | 8/1989 | Ginkel |
| 4,865,812 A | 9/1989 | Kuntz et al. |
| 4,866,769 A | 9/1989 | Karp |
| 4,879,704 A | 11/1989 | Takagi et al. |
| 4,882,195 A | 11/1989 | Butland |
| 4,889,365 A | 12/1989 | Chouinard |
| 4,897,173 A | 1/1990 | Nankai et al. |
| 4,921,280 A | 5/1990 | Jalon |
| 4,927,180 A | 5/1990 | Trundle et al. |
| 4,940,618 A | 7/1990 | Hamada et al. |
| 4,948,442 A | 8/1990 | Manns |
| 4,966,856 A | 10/1990 | Ito et al. |
| 4,975,898 A | 12/1990 | Yoshida |
| 4,983,817 A | 1/1991 | Dolash et al. |
| 5,005,873 A | 4/1991 | West |
| 5,018,866 A | 5/1991 | Osten |
| 5,027,396 A | 6/1991 | Platteter et al. |
| 5,030,421 A | 7/1991 | Muller |
| 5,030,832 A | 7/1991 | Williams et al. |
| 5,039,490 A | 8/1991 | Marsoner et al. |
| 5,047,215 A | 9/1991 | Manns |
| 5,049,673 A | 9/1991 | Tsien et al. |
| 5,075,147 A | 12/1991 | Usami et al. |
| 5,080,946 A | 1/1992 | Takagisi et al. |
| 5,093,147 A | 3/1992 | Andrus et al. |
| 5,106,582 A | 4/1992 | Baker |
| 5,118,349 A | 6/1992 | Jalon |
| 5,128,243 A | 7/1992 | Potter et al. |
| 5,128,882 A | 7/1992 | Cooper et al. |
| 5,132,954 A | 7/1992 | Kulakowski et al. |
| 5,135,569 A | 8/1992 | Mathias |
| 5,139,812 A | 8/1992 | Lebacq |
| 5,147,042 A | 9/1992 | Levy |
| 5,176,257 A | 1/1993 | Levy |
| 5,182,669 A | 1/1993 | Chikuma et al. |
| 5,194,289 A | 3/1993 | Butland |
| 5,194,290 A | 3/1993 | Robertson |
| 5,200,051 A | 4/1993 | Cozzette et al. |
| 5,204,852 A | 4/1993 | Nakagawa et al. |
| 5,208,630 A | 5/1993 | Goodbrand et al. |
| 5,213,955 A | 5/1993 | Hamada et al. |
| 5,243,411 A | 9/1993 | Shirochi et al. |
| 5,246,869 A | 9/1993 | Potter et al. |
| 5,260,032 A | 11/1993 | Muller |
| 5,264,103 A | 11/1993 | Yoshioka et al. |
| 5,265,082 A | 11/1993 | Gniwek et al. |
| 5,267,311 A | 11/1993 | Bakhoum |
| 5,272,090 A | 12/1993 | Gavish et al. |
| 5,279,967 A | 1/1994 | Bode |
| 5,282,894 A | 2/1994 | Albert et al. |
| 5,286,286 A | 2/1994 | Winnik et al. |
| 5,292,000 A | 3/1994 | Levy |
| 5,292,855 A | 3/1994 | Krutak et al. |
| 5,311,494 A | 5/1994 | Sugita et al. |
| 5,313,264 A | 5/1994 | Ivarsson et al. |
| 5,319,436 A | 6/1994 | Manns et al. |
| 5,321,261 A | 6/1994 | Valenta |
| 5,336,714 A | 8/1994 | Krutak et al. |
| 5,338,066 A | 8/1994 | Gundjian |
| 5,338,067 A | 8/1994 | Gundjian |
| 5,360,628 A | 11/1994 | Butland |
| 5,366,902 A | 11/1994 | Cox et al. |
| 5,379,433 A | 1/1995 | Yamagishi |
| 5,381,476 A | 1/1995 | Kimoto et al. |
| 5,388,085 A | 2/1995 | Jaquette |
| 5,399,451 A | 3/1995 | Hashida et al. |
| 5,400,319 A | 3/1995 | Fite et al. |
| 5,409,583 A | 4/1995 | Yoshioka et al. |
| 5,409,666 A | 4/1995 | Nagel et al. |
| 5,418,852 A | 5/1995 | Itami et al. |
| 5,418,855 A | 5/1995 | Liang et al. |
| 5,421,869 A | 6/1995 | Gundjian et al. |
| 5,424,959 A | 6/1995 | Reyes et al. |
| 5,426,625 A | 6/1995 | Bui et al. |
| 5,429,952 A | 7/1995 | Garner et al. |
| 5,430,281 A | 7/1995 | Lentz et al. |
| 5,438,403 A | 8/1995 | Hoshino et al. |

| | | | | | | |
|---|---|---|---|---|---|---|
| 5,450,190 | A | 9/1995 | Schwartz et al. | 5,740,574 A | 4/1998 | Piraino |
| 5,453,968 | A | 9/1995 | Veldhuis et al. | 5,753,511 A | 5/1998 | Selinfreund |
| 5,457,527 | A | 10/1995 | Manns et al. | 5,760,384 A | 6/1998 | Itoh et al. |
| 5,461,239 | A | 10/1995 | Atherton | 5,761,301 A | 6/1998 | Oshima et al. |
| 5,468,650 | A | 11/1995 | Skov et al. | 5,762,873 A | 6/1998 | Fanning et al. |
| 5,473,584 | A | 12/1995 | Oshima | 5,770,348 A | 6/1998 | Kondo |
| 5,475,468 | A | 12/1995 | Natsudaira | 5,773,808 A | 6/1998 | Laser |
| 5,494,638 | A | 2/1996 | Gullick | 5,774,160 A | 6/1998 | Gundjian |
| 5,496,701 | A | 3/1996 | Pollard-Knight | 5,776,713 A | 7/1998 | Garner et al. |
| 5,498,549 | A | 3/1996 | Nagel et al. | 5,784,193 A | 7/1998 | Ferguson |
| 5,510,163 | A | 4/1996 | Sullivan | 5,786,182 A | 7/1998 | Catanzariti et al. |
| 5,513,169 | A | 4/1996 | Fite et al. | 5,786,509 A | 7/1998 | Belding et al. |
| 5,513,260 | A | 4/1996 | Ryan | 5,790,489 A | 8/1998 | O'Connor |
| 5,516,362 | A | 5/1996 | Gundjian et al. | 5,800,785 A | 9/1998 | Bochner |
| 5,521,984 | A | 5/1996 | Denenberg et al. | 5,805,549 A | 9/1998 | Fite et al. |
| 5,525,516 | A | 6/1996 | Krutak et al. | 5,805,551 A | 9/1998 | Oshoma et al. |
| 5,526,329 | A | 6/1996 | Bish et al. | 5,807,625 A | 9/1998 | Amon et al. |
| 5,532,104 | A | 7/1996 | Goto | 5,811,152 A | 9/1998 | Cleary |
| 5,538,773 | A | 7/1996 | Kondo | 5,815,484 A | 9/1998 | Smith |
| 5,545,567 | A | 8/1996 | Gretillat et al. | 5,818,582 A | 10/1998 | Fernandez et al. |
| 5,546,471 | A | 8/1996 | Merjanian | 5,822,473 A | 10/1998 | Magel et al. |
| 5,547,501 | A | 8/1996 | Maruyama et al. | 5,837,042 A | 11/1998 | Lent et al. |
| 5,563,947 | A | 10/1996 | Kikinis | 5,841,861 A | 11/1998 | Kondo et al. |
| 5,568,177 | A | 10/1996 | Talvalkar et al. | 5,847,141 A | 12/1998 | Malkin |
| 5,569,317 | A | 10/1996 | Sarada et al. | 5,851,489 A | 12/1998 | Wolf et al. |
| 5,569,613 | A | 10/1996 | Yang | 5,856,174 A | 1/1999 | Lipshutz et al. |
| 5,570,379 | A | 10/1996 | Sasaki et al. | 5,861,618 A | 1/1999 | Berson |
| 5,572,589 | A | 11/1996 | Waters et al. | 5,867,586 A | 2/1999 | Liang et al. |
| 5,574,787 | A | 11/1996 | Ryan | 5,874,219 A | 2/1999 | Rava et al. |
| 5,574,790 | A | 11/1996 | Liang et al. | 5,881,038 A | 3/1999 | Oshima et al. |
| 5,582,697 | A | 12/1996 | Ikeda et al. | 5,905,800 A | 5/1999 | Moskowitz et al. |
| 5,587,984 | A | 12/1996 | Owa et al. | 5,907,144 A | 5/1999 | Poon et al. |
| 5,589,350 | A | 12/1996 | Bochner | 5,915,027 A | 6/1999 | Cox et al. |
| 5,592,454 | A | 1/1997 | Tobita et al. | 5,919,712 A | 7/1999 | Herron et al. |
| 5,596,639 | A | 1/1997 | Kikinis | 5,922,188 A | 7/1999 | Ikeda et al. |
| 5,598,399 | A | 1/1997 | Ogihara et al. | 5,922,550 A | 7/1999 | Everhart et al. |
| 5,599,578 | A | 2/1997 | Butland | 5,922,591 A | 7/1999 | Anderson et al. |
| 5,608,225 | A | 3/1997 | Kamimura et al. | 5,922,594 A | 7/1999 | Lofas |
| 5,608,717 | A | 3/1997 | Ito et al. | 5,923,413 A | 7/1999 | Laskowski |
| 5,611,433 | A | 3/1997 | Levy | 5,923,754 A | 7/1999 | Angelo et al. |
| 5,613,001 | A | 3/1997 | Bakhoum | 5,927,547 A | 7/1999 | Papen et al. |
| 5,614,008 | A | 3/1997 | Escano et al. | 5,930,215 A | 7/1999 | Fite et al. |
| 5,615,061 | A | 3/1997 | Singh | 5,930,217 A | 7/1999 | Kayanuma |
| 5,618,682 | A | 4/1997 | Scheirer | 5,933,498 A | 8/1999 | Schneck et al. |
| 5,625,706 | A | 4/1997 | Lee et al. | 5,936,878 A | 8/1999 | Arsenov et al. |
| 5,629,914 | A | 5/1997 | Clark et al. | 5,937,164 A | 8/1999 | Mages et al. |
| 5,631,170 | A | 5/1997 | Attridge | 5,939,024 A | 8/1999 | Robertson |
| 5,632,959 | A | 5/1997 | Mohajer | 5,945,252 A | 8/1999 | Sokoluk et al. |
| 5,633,836 | A | 5/1997 | Langer et al. | D414,272 S | 9/1999 | O'Bear et al. |
| 5,636,292 | A | 6/1997 | Rhoads | 5,949,601 A | 9/1999 | Braithwaite et al. |
| 5,641,640 | A | 6/1997 | Hanning | 5,953,417 A | 9/1999 | Quan |
| 5,644,444 | A | 7/1997 | Braithwaite et al. | 5,955,352 A | 9/1999 | Inoue et al. |
| 5,644,566 | A | 7/1997 | Nakayama et al. | 5,955,729 A | 9/1999 | Nelson et al. |
| 5,648,197 | A | 7/1997 | Kuroda | 5,958,541 A | 9/1999 | Miller et al. |
| 5,650,062 | A | 7/1997 | Ikeda et al. | 5,961,926 A | 10/1999 | Kolb et al. |
| 5,651,869 | A | 7/1997 | Yoshioka et al. | 5,963,536 A | 10/1999 | Vasic et al. |
| 5,652,838 | A | 7/1997 | Lovett et al. | 5,966,205 A | 10/1999 | Jung et al. |
| 5,661,703 | A | 8/1997 | Moribe et al. | 5,989,835 A | 11/1999 | Dunlay et al. |
| 5,665,151 | A | 9/1997 | Escano et al. | 5,998,128 A | 12/1999 | Roelant |
| 5,671,202 | A | 9/1997 | Brownstein et al. | 6,001,573 A | 12/1999 | Roelant |
| 5,671,288 | A | 9/1997 | Wilhelm et al. | 6,002,830 A | 12/1999 | Quan |
| 5,673,338 | A | 9/1997 | Denenberg et al. | 6,009,065 A | 12/1999 | Glushko et al. |
| 5,677,952 | A | 10/1997 | Blakley, III et al. | 6,009,071 A | 12/1999 | Ahn et al. |
| 5,680,383 | A | 10/1997 | Clark et al. | 6,011,772 A | 1/2000 | Rollhaus |
| 5,681,633 | A | 10/1997 | Onagi et al. | 6,018,374 A | 1/2000 | Wrobleski |
| 5,706,047 | A | 1/1998 | Lentz et al. | 6,027,855 A | 2/2000 | Sokoluk et al. |
| 5,706,266 | A | 1/1998 | Brownstein et al. | 6,031,815 A | 2/2000 | Heemskerk et al. |
| 5,710,626 | A | 1/1998 | O'Rourke et al. | 6,039,898 A | 3/2000 | Glushko |
| 5,711,915 | A | 1/1998 | Siegmund et al. | 6,052,354 A | 4/2000 | Gudesen et al. |
| 5,716,825 | A | 2/1998 | Hancock et al. | 6,052,465 A | 4/2000 | Gotoh et al. |
| 5,719,948 | A | 2/1998 | Liang | 6,071,671 A | 6/2000 | Glushko et al. |
| 5,728,350 | A | 3/1998 | Kinoshita et al. | 6,094,413 A | 7/2000 | Guerra |
| 5,736,342 | A | 4/1998 | Van Wie et al. | 6,099,930 A | 8/2000 | Cyr et al. |

| | | | |
|---|---|---|---|
| 6,104,561 | A | 8/2000 | Braithwaite et al. |
| 6,104,686 | A | 8/2000 | Whitcher et al. |
| 6,115,344 | A | 9/2000 | Gudesen et al. |
| 6,122,245 | A | 9/2000 | Kondo et al. |
| 6,122,373 | A | 9/2000 | Gotoh et al. |
| 6,125,181 | A | 9/2000 | Gotoh et al. |
| 6,128,388 | A | 10/2000 | Gotoh et al. |
| 6,139,933 | A | 10/2000 | Van Wijk |
| 6,141,419 | A | 10/2000 | Gotoh et al. |
| 6,144,742 | A | 11/2000 | Gotoh et al. |
| 6,157,551 | A | 12/2000 | Barak et al. |
| 6,160,888 | A | 12/2000 | Gotoh et al. |
| 6,173,109 | B1 | 1/2001 | Quan |
| 6,175,629 | B1 | 1/2001 | Gotoh et al. |
| 6,188,659 | B1 | 2/2001 | Mueller et al. |
| 6,192,475 | B1 | 2/2001 | Wallace |
| 6,219,329 | B1 | 4/2001 | Tanaka et al. |
| 6,232,124 | B1 | 5/2001 | Selinfreund |
| 6,580,680 | B1 | 6/2003 | Van Den Enden et al. |
| 6,589,626 | B2 | 7/2003 | Selinfreund et al. |
| 6,638,593 | B2 | 10/2003 | Selinfreund et al. |
| 6,838,145 | B2 * | 1/2005 | Drew et al. ................. 428/64.1 |
| 7,035,200 | B2 * | 4/2006 | Selinfreund et al. ........ 369/288 |
| 2003/0219124 | A1 * | 11/2003 | Selinfreund et al. ........ 380/201 |
| 2004/0004922 | A1 * | 1/2004 | Selinfreund et al. ..... 369/53.21 |

FOREIGN PATENT DOCUMENTS

| | | |
|---|---|---|
| DE | 196 17 106 A1 | 10/1997 |
| EP | 0 327 163 A2 | 8/1989 |
| EP | 0353391 A2 | 2/1990 |
| EP | 0 460 346 A2 | 12/1991 |
| EP | 0 589 991 B1 | 4/1994 |
| EP | 0 591 315 B1 | 4/1994 |
| EP | 0 736 767 A1 | 10/1996 |
| GB | 1 334 866 | 10/1973 |
| GB | 2 258 528 A | 2/1993 |
| GB | 2 298 713 B | 9/1996 |
| GB | 2 334 574 A | 8/1999 |
| JP | 63184039 | 7/1988 |
| JP | 1-211285 | 8/1989 |
| JP | 4-128834 | 4/1992 |
| JP | 6-204371 | 2/1994 |
| JP | 9-292071 | 11/1997 |
| JP | 11-126425 | 5/1999 |
| WO | WO 95/06249 | 3/1995 |
| WO | WO 97/31332 | 8/1997 |
| WO | WO 98/08180 | 2/1998 |
| WO | WO 98/29238 | 7/1998 |
| WO | WO 99/14055 | 3/1999 |
| WO | WO 99/23649 | 5/1999 |
| WO | WO 99/55055 | 10/1999 |
| WO | WO 00/19430 | 4/2000 |

OTHER PUBLICATIONS

Amato, "Fomenting a Revolution in Miniature", Science, vol. 282, pp. 402-404 Oct. 16, 1998.

Anslyn et al. "Rapid and Efficient Analysis of Multiple Chemical/Biochemical Agents in Soultion Using Sensor Arrays: Toward the Development of an Electronic Tongue," The University of Texas at Austin, undated.

Barrett, "Molecular Fingerprinting of Food Bourne Pathogens," CDD IFT Symposium, Jun. 21-22, 1996.

Biacore Website, "Sensor chips for BIACORE analysis systems", downloaded from webmaster.bia@eu.biacore.com; undated.

Biacore Website, "Principles of BIAtechnology", downloaded from webmaster.bia@eu.biacore.com, undated.

Biacore Website, "protein binding", downloaded from webmaster. bia@eu.biacore.com, undated.

Biodiscovery website, "Inventing Expression Bioinformatics", undated.

Biocode product literature, "Covert Product Identification".

Crossley, R. "Synthesis and Properties of a Potential Extracellular Fluorescent Probe," Perkin Transactions 2, vol. 199, No. 7, pp. 1615-1623, Jul. 1994.

Dragoco Report, pp. 12-13, 1990.

Fluorescent Inks, downloaded from http://www.uvp.com/html/inks.html; downloaded Jul. 1999.

Freemantle, M. "Downsizing Chemistry: Chemical Analysis and Synthesis of Microchips Promise a Variety of Potential Benefits," Chemical and Engineering News, vol. 77, No. 8, pp. 27-37, Feb. 22, 1999.

Furomoto, H.W. "Ultraviolet Organic Liquid Lasers," IEEE Journal of Quantum Electronics, vol. 6, No. 5, pp. 262-268, May 1970.

Furneaux, R. "The Formation of Controlled-Porosity Membranes from Anodically-Oxidized Aluminum," Nature, vol. 337, pp. 147-148 Jan. 1989.

Genometrix Website, undated.

Guilbault, G. "General Aspects of Luminescence Spectroscopy" in Practical Fluorescence, 2nd Edition, pp. 27-40, 1990.

Gill, D. "Inhibition of Fading in Fluorescence Microscopy of Fixed Cells," Experientia, vol. 35, No. 3, pp. 400-401, Mar. 15, 1979.

Huff, J. "Enhancement of Specific Immunofluorescent Findings with Use of a Para-Phenylenediamine Mounting Buffer," The Journal of Investigative Dermatology vol. 78, No. 5, 449-450, 1982.

Iatridou, H. "The Development of a New Family of Intracellular Calcium Probes," Cell Calcium, pp. 190-198, Feb. 1994.

The Invisible Barcode, downloaded from http://www.canadianpackaging.com/C...aging, downloaded Jul. 1999.

Johnson, G. "Fading of Immunofluorescence during Microscopy: a Study of the Phenomenon and its Remedy," Journal of Immunological Methods vol. 55, pp. 231-242, 1982.

Johnson, G. "A Simple Method of Reducing the Fading of Immunofluorescence during Microscopy," Journal of Immunological Methods, vol. 43, pp. 349-350, 1981.

Junior LB 9509, the portable luminometer; downloaded from http://www.berthold.com.au/bioanalyticalpages/LB9509.html, downloaded Oct. 26, 1999.

Larsen, R. "Spectroscopic and Molecular Modeling Studies of Caffeine Complexes with DNA Intercalators," Biophysical Journal, vol. 70, pp. 443-452, Jan. 1996.

Lee, S. "A Fluorometric Assay for DNA Cleavage Reactions Characterized with BamHI Restriction Endonuclease," Analytical Biochemistry vol. 220, pp. 377-383, 1994.

McDevitt, J. "Rapid and Efficient Analysis of Multiple Chemical/Biochemical Agents in Solution Using Sensor Arrays: Toward the Development of an Electronic Taste Chip", in Taste Chip Technology Description, by University of Texas at Austin.

Minta, Akwasi, "Fluorescent Indicators for Cytosolic Calcium Based on Rhodamine and Fluorescein Chromophores," The Journal of Biological Chemistry, vol. 264, No. 14, pp. 8171-8178, 1989.

Packard Website, "The Biochip Arrayer", downloaded from www.packardinst.com/prod_serv/-Biochiparrayer.htm, Oct. 26, 1999.

Packard Instrument Company website disclosure: Tools for Life Science Research, pp. 1-2.

Platt, J. L., et al., "Retardation of Fading and Enhancement of Intensity of Immunofluorescence by p-phenylenediamine," Journal of Histochemistry and Cytochemistry, vol. 31, No. 6, pp. 840-842, Jun. 1983.

Phosphor Technology, downloaded from http:/www.phosphor.demon.co.uk/iruv.htm; downloaded Jul. 1999.

Practical Fluorescence, Second Edition, G.G. Guilbault, Editor, Marcel Dekker, Inc., p. 32, 1990.

Raybourne, "Flow Cytometry in Food Microbiology," IFT Symposium FDA Jun. 21-22, 1996.

Schauer et al., "Cross-reactive optical sensor arrays", ACS Meetings, San Francisco National Meeting, downloaded from http://schedule.acs.org/cgi-bin/ACS/perso..., Mar. 7, 2000.

Service, R. "Coming Soon: The Pocket DNA Sequencer," Science, vol. 282, pp. 399-401 Oct. 1998.

Service, R. "Microchip Arrays Put DNA on the Spot," Science, vol. 282, pp. 396-399 Oct. 1998.

Skolnick A. "Russian and U.S. Researchers Develop 'Biochips' for Faster, Inexpensive Biomedical Tests," Journal of the American Medical Association, vol. 275, No. 8, pp. 581-582.

Stanley, "UT scientists engineer a tiny arbiter of taste", Austin American Statesman Newspaper, p. B1, Jul. 26, 1998.

Stringer, J. "Photonics Center Launches Three New Companies" Apr. 1999.

Stryer, L. "Fluorescence Energy Transfer as a Spectroscopic Ruler," Annual Review of Biochemistry, vol. 47, pp. 819-846, 1978.

Tarkka, Richard M., et al., "Holographic storage in a near-ir sensitive photochromic dye," Optics Communications, vol. 109, pp. 54-58, Jun. 15, 1994.

Uchiyama, H. "Detection of Undegraded Oligonucleotides in Vivo by Fluorescence Resonance Energy Transfer," The Journal of Biological Chemistry, vol. 271, No. 1, pp. 380-384, Jan. 5, 1996.

V.L. Engineering, Our Products, downloaded from http://www.vlengineering.com/products/wizard_PV6A, downloaded Jul. 1999.

Wittwer, C. "Continuous Fluorescence Monitoring of Rapid Cycle DNA Amplification," Biotechniques, vol. 22, pp. 130-138, Jan. 1997.

von Campe, G. "Terpene-free Citrus Oils," Dragoco Report, Jan. 1990.

"Blak-Ray Fluorescent Inks" downloaded from http://www.uvp.com/html/inks.html.

International Search Report For PCT/US01/10256 mailed Aug. 2, 2002.

Skoog et al., Principles of Instrumental Analysis, (1980) pp. 282-287,307.

Seto D, et al. Anal. Biochem. 189 pp. 51-53 n(1990).

Draper, D E. Biophys. Chem 21 pp. 91-101(1985).

Peng et al J.AM. Chem. Soc. 119 p. 719-729 (1997).

Glabe, Charles G. "Preparation and Properties of Fluorescent Polysaccharides," Analytical Biochemistry, vol. 130, pp. 287-294, 1983.

Bock, G., et al., "Photometric Analysis of Antifading Reagents for Immunofluorescence with Laser and Conventional Illumination Sources," Journal of Histochemistry and Cytochemistry, 33: 699-705 (1985).

Cambridge Healthtech Institute Website, downloaded from www.healthtech.com, undated.

Chan, "Interaction of Aminoacridines with DNA," Biochimica et Biophysica Acta, vol. 204, pp. 252-254, Mar. 19, 1970.

Constant et al., ACS Abstract, Issue of Chemical and Engineering News, Aug. 25, 1994.

Coons, "Localization of Antigen in Tissue Cells," The Journal of Experimental Medicine, vol. 91, pp. 1-13, Jan. 1, 1950.

Corning Microarray Technology Website, "CMT-GAPS Coated Slides—FAQ's", downloaded from www.cmt.corning.com/dev/company info/who/techno..., Oct. 26, 1999.

Biocode product literature, "Covert Product Identification", no date.

McDevitt, J. "Rapid and Efficient Analysis of Multiple Chemical/Biochemical Agents in Solution Using Sensor Arrays: Toward the Development of an Electronic Taste Chip", in *Taste Chip Technology Description*, by University of Texas at Austin, no date.

Packard Instrument Company website disclosure: Tools for Life Science Research, pp. 1-2, no date.

Skolnick A. "Russian and U.S. Researchers Develop 'Biochips' for Faster, Inexpensive Biomedical Tests," Journal of the American Medical Association, vol. 275, No. 8, pp. 581-582, Feb. 28, 1996.

"Blak-Ray Fluorescent Inks" downloaded from http://www.uvp.com/html/inks.html, no date.

* cited by examiner

COPY-PROTECTED OPTICAL MEDIA AND METHOD OF MANUFACTURE THEREOF

RELATED ART

This application is a continuation application of U.S. patent application Ser. No. 10/650,319, filed on Aug. 28, 2003, now U.S. Pat. No. 6,838,145 which is a continuation of U.S. patent application Ser. No. 09/879,457, filed on Jun. 12, 2001, now U.S. Pat. No. 6,638,593 which is a continuation-in-part of U.S. patent application Ser. No. 09/821,577, filed on Mar. 29, 2001, now U.S. Pat. No. 6,589,626 which is a continuation-in-part of U.S. patent application Ser. No. 09/739,090, filed Dec. 15, 2000, abandoned which is a continuation-in-part application of U.S. patent application Ser. No. 09/631,585, filed Aug. 3, 2000 and U.S. patent application Ser. No. 09/608,886, filed Jun. 30, 2000, abandoned from which priority is claimed, all of which are herein incorporated by reference.

BACKGROUND OF THE INVENTION

1. Field of the Invention

The present invention generally relates to copy-protected optical information recording media and methods for manufacturing the same. More specifically, the present invention relates to the manufacture of an optically readable digital storage medium that protects the information stored thereon from being copied using conventional optical medium readers, such as CD and DVD laser readers, but permits reading of the information from the digital storage media by the same readers.

2. Background of the Invention

Optical data storage media ("optical media") are media in which data is stored in an optically readable manner. Data on optical media are encoded by optical changes in one or more layers of the media. Optical data media are used to distribute, store and access large volumes of data. Formats of optical medium include read-only formats such as CD-DA (digital audio compact disc), CD-ROM (CD-read-only memory), DVD (digital versatile disc or digital video disc) media, write-once read-many times (WORM) formats such as CD-R (CD-recordable), and DVD-R (DVD-recordable), as well as rewritable formats such as found on magneto-optical (MO) discs, CD-RW (CD-rewritable), DVD-RAM (DVD-Random Access Media), DVD–RW or DVD+RW (DVD-rewritable), PD (Phase change Dual disk by Panasonic) and other phase change optical discs. Erasable, or rewritable, optical discs function in a similar manner to magneto-optical (MO) disks and can be rewritten over and over. MO discs are very robust and are geared to business applications, typically in high-capacity disk libraries.

Optical media have grown tremendously in popularity since their first introduction owing in a great deal to their high capacity for storing data as well as their open standards. For example, a commercially available magnetic floppy diskette is only capable of storing 1.44 Mb of data, whereas an optical CD-ROM of approximately the same size can have a capacity in excess of 600 MB. A DVD has a recording density which is significantly greater than a CD. For example, conventional DVD read-only discs currently have a capacity of from 4.7 GB (DVD-5, 1 side/1 layer) to 17.0 GB (DVD-18, 2 sides/2 layers), write-once DVDs a capacity of 3.95 GB (DVD-R, 1 side/1 layer) to 7.90 GB (DVD-R, 2 sides/1 layer) (newer DVD-Rs can hold up to 4.7 GB per side), and conventional rewritable DVDs of from 2.6 GB (DVD-RAM, 1 side/1 layer) to 10.4 GB (MMVF, 2 sides/1 layer). Optical discs have made great strides in replacing cassette tapes and floppy disks in the music and software industries, and significant in-roads in replacing videocassette tapes in the home video industry.

Data is stored on optical media by forming optical deformations or marks at discrete locations in one or more layers of the medium. Such deformations or marks effectuate changes in light reflectivity. To read the data on an optical medium, an optical medium player or reader is used. An optical medium player or reader conventionally shines a small spot of laser light, the "readout" spot, through the disc substrate onto the data layer containing such optical deformations or marks as the medium or laser head rotates.

In conventional "read-only" type optical media (e.g., "CD-ROM"), data is generally stored as a series of "pits" embossed with a plane of "lands". Microscopic pits formed in the surface of the plastic medium are arranged in tracks, conventionally spaced radially from the center hub in a spiral track originating at the medium center hub and ending toward the medium's outer rim. The pitted side of the medium is coated with a reflectance layer such as a thin layer of aluminum or gold. A lacquer layer is typically coated thereon as a protective layer.

The intensity of the light reflected from a read-only medium's surface by an optical medium player or reader varies according to the presence or absence of pits along the information track. When the readout spot is over the flat part of the track more light is reflected directly from the disc than when the readout spot is over a pit. A photodetector and other electronics inside the optical medium player translate the signal from the transition points between these pits and lands caused by this variation into the 0s and 1s of the digital code representing the stored information.

A number of types of optical media are available which permit an end-user to record data on the media, such optical media generally are categorized as "writable" or "recordable," or "rewritable."

"Writable" or "recordable" optical media (e.g., "CD-R" discs) permit an end-user to write data permanently to the medium. Writable media are designed such that laser light in the writer apparatus causes permanent deformations or changes in the optical reflectivity of discrete areas of the data layer(s) of the medium. Numerous writable optical media are known, including those that employ a laser deformable layer in their construct upon which optically-readable areas analogous to the pits and lands found in conventional read-only optical media can be formed (See, e.g., EP-A2-0353391), those that employ a liquid-crystalline material in their data layer(s) such that irradiation with the laser beam causes permanent optical deformations in the data layer (See, e.g., U.S. Pat. No. 6,139,933 which employs such layer between two reflective layers to effect a Fabry-Perot interferometer), and those that utilize a dye that irreversibly changes state when exposed to a high power writing laser diode and maintains such state when read with a low power reading laser (so-called, WORM, write-once-read-many times, optical media).

Rewritable optical media (e.g., "CD-RW", "DVD-RAM", "DVD–RW", "DVD+RW" and "PD" media) use the laser beam to cause reversible optical deformations or marks in the data layer(s), such that the data layer is capable of being written on, read, erased and rewritten on many times. Several rewritable optical media systems are known.

In one system, an optically-deformable data layer is deformed in discrete areas by the writing laser to form optical changes representative of the data, for example, pits and lands, and erased by uniformly deforming the same optically-deformable data layer, or the portion thereof wherein the data desired to be deleted is found. In another system, a photochromic material layer is used to store the data. In this system, the photochromic material reversibly changes when the material is irradiated by light possessing certain wavelengths. For example, a colorless compound may change its molecular state to a quasi-stable colored state when irradiated by ultraviolet (UV) light, yet be returned to the colorless state upon exposure to visible light. By selectively irradiating the photochromic material layer with the one wavelength to cause an optical change, and then irradiating with the other wavelength to reverse such optical change, one is permitted to write, erase, and re-write data.

Materials that change color due to a change in crystalline state have been found to be particularly useful in rewritable media. In one system, a material that is dark in the amorphous state, but bright in the crystalline state, is used to record the data. In such system, dark amorphous marks are formed utilizing a short high-power laser pulse that melts the recording material followed by quenching to temperatures below the crystalline temperature. The data formed thereby, can be erased by heating the amorphous state over a long enough period of time between the temperature of crystallization and temperature of melt to regain the crystalline state. Ternary stoichiometric compounds containing Ge, Sb and Te (e.g., $Ge_1Sb_2Te_4$ $Ge_2Sb_2Te_5$) are in particular known to show a large optical contrast between amorphous and crystalline phase and have acceptable melting temperatures ($t_{cryst}$=about 150-200° C., $t_{melt}$=about 600° C.). Alloys of such compounds with antimony (Sb), cadmium (Cd) and tin (Sn) have also been employed in rewritable media.

In rewritable optical media control information such as address data, rotation control signal, user information etc. is generally previously recorded on the header field in the form of pre-pits.

Data may also be stored in what are referred to as fluorescent multilayer disks. In fluorescent memory storage, the data is present as local variations of fluorescent substance properties. Typically the substance is illuminated with radiation at excitation wavelength, and the fluorescence signal is registered at a different wavelength. A spectral filter is used to separate the fluorescent signal at the receiver from the noise of the excitation radiation. Data may be stored in a 3-D manner using the fluorescent principle. The two-photon approach is often utilized when the fluorescent medium is to be rewritable. In this approach a fluorescent medium containing photochromic molecules capable of existing in two isomeric forms is used. The first isomeric form is not fluorescent and has absorption bands for UV radiation, and is capable of being transferred into the second isomeric form upon the simultaneous absorption of two long wavelength photons, said second isomeric form being capable of exhibiting fluorescence.

Hybrid optical media are also known. For example, "half-and-half" discs are known wherein one portion of the disc has conventional CD-ROM pits and the other portion of the disc has a groove pressed into the disc with a dye layer thereover to form a CD-R portion. A relatively new hybrid optical media is the CD-PROM (i.e., CD programmable ROM). The CD-PROM medium combines a read-only CD-ROM format with a recordable CD-R format on one medium, but features only a single continuous groove on the medium with the entire medium coated with a dye layer. The geometry of the continuous groove of the CD-PROM medium is modulated so as to look like ROM pits to an optical reader. It also provides no dye transition issues to overcome in manufacturing.

An optical disc medium read by moving a read head generating a radiation beam in a specified path relative to the optical medium. The radiation beam is used to differentiate regions having different optical properties, such different optical properties being used to represent the data, for example, the "on" logical state being represented by a particular region. The detectable differences are converted into electrical signals, which are then converted to a format that can be conveniently manipulated by a signal processing system. For example, by setting a threshold level of reflectance, transitions between pits and lands may be detected at the point where the signal generated from the reflectance crosses a threshold level. The pits represent a 1 and lands a 0. In this manner, binary information may be read from the medium.

The vast majority of commercially-available software, video, audio, and entertainment pieces available today are recorded in read-only optical format. One reason for this is that data replication onto read-only optical formats is significantly cheaper than data replication onto writable and rewritable optical formats. Another reason is that read-only formats are less problematical from a reading reliability standpoint. For example, some CD readers/players have trouble reading CD-R media, which has a lower reflectivity, and thus requires a higher-powered reading laser, or one that is better "tuned" to a specific wavelength.

Data is conventionally written onto pre-fabricated writable and rewritable medium individually, for example, one disc at a time, using a laser. Data is conventionally stamped onto read-only media by a die molding (injection molding) process during the manufacture of the read-only medium. Today many more data-containing optical media can be manufactured by the stamping process than by the laser writing process over a set unit of time, significantly reducing the cost of such stamped read-only optical media for large quantities of optical media. The manufacturing of a stamped medium is also considerably cheaper than in fabricating a fluorescent multi-layer medium.

Interference/reflectivity type optical media comprising a read-only format are typically manufactured following a number of defined steps:

Data to be encoded on the medium is first pre-mastered (formatted) such that data can be converted into a series of laser bursts by a laser, which will be directed onto a glass master platter. The glass master platter is conventionally coated with a photoresist such that when the laser beam from the LBR (laser beam recorder) hits the glass master, a portion of the photoresist coat is "burnt" or exposed. After being exposed to the laser beam, it is cured and the photoresist in the unexposed area rinsed off. The resulting glass master is electroplated with a metal, typically Ag or Ni. The electroformed stamper medium thus formed has physical features representing the data. When large numbers of optical media of the disc-type are to be manufactured, the electroformed stamper medium is conventionally called a "father disc." The father disc is typically used to make a mirror image "mother disc," which is used to make a plurality of "children discs" often referred to as "stampers" in the art. Stampers are used to make production quantities of replica discs, each containing the data and tracking information that was recorded, on the glass master. If only a few discs are to be replicated (fewer than 10,000) and time or costs are to be conserved, the original "father" disc might be used as the stamper in the mold rather than creating an entire "stamper family" consisting of "father," "mother" and "children" stampers.

The stamper is typically used in conjunction with an injection molder to produce replica media. Commercially-available injection molding machines subject the mold to a large amount of pressure by piston-driven presses, in excess of 20,000 pounds.

In the optical medium molding process, a resin is forced in through a sprue channel into a cavity within the optical tooling (mold) to form the optical medium substrate. Today most optical discs are made of optical-grade polycarbonate which is kept dry and clean to protect against reaction with moisture or other contaminants which may introduce birefringence and other problems into the disc, and which is injected into the mold in a molten state at a controlled temperature. The format of the grooves or pits is replicated in the substrate by the stamper as the cavity is filled and compressed against the stamper. After the part has sufficiently cooled, the optical tooling mold is opened and the sprue and product eject are brought forward for ejecting the formed optical medium off of the stamper. The ejected substrate is handed out by a robot arm or gravity feed to the next station in the replication line, with transport time and distance between stations giving the substrate a chance to cool and harden.

The next step after molding in the manufacture of a read-only format is to apply a layer of reflective metal to the data-bearing side of the substrate (the side with the pits and lands). This is generally accomplished by a sputtering process, where the plastic medium is placed in a vacuum chamber with a metal target, and electrons are shot at the target, bouncing individual molecules of the metal onto the medium, which attracts and holds them by static electricity. The sputtered medium is then removed from the sputtering chamber and spin-coated with a polymer, typically a UV-curable lacquer, over the metal to protect the metal layer from wear and corrosion. Spin-coating occurs when the dispenser measures out a quantity of the polymer onto the medium in the spin-coating chamber and the medium is spun rapidly to disperse the polymer evenly over its entire surface.

After spin-coating, the lacquer (when lacquer is used as the coat) is cured by exposing it to UV radiation from a lamp, and the media are visually inspected for reflectivity using a photodiode to ensure sufficient metal was deposited on the substrate in a sufficiently thick layer so as to permit every bit of data to be read accurately. Optical media that fail the visual inspection are loaded onto a reject spindle and later discarded. Those that pass are generally taken to another station for labeling or packaging. Some of the "passed" media may be spot-checked with other testing equipment for quality assurance purposes.

Optical media have greatly reduced the manufacturing costs involved in selling content such as software, video and audio works, and games, due to their small size and the relatively inexpensive amount of resources involved in their production. They have also unfortunately improved the economics of the pirate, and in some media, such as video and audio, have permitted significantly better pirated-copies to be sold to the general public than permitted with other data storage media. Media distributors report the loss of billions of dollars of potential sales due to high quality copies.

Typically, a pirate makes an optical master by extracting logic data from the optical medium, copying it onto a magnetic tape, and setting the tape on a mastering apparatus. Pirates also sometimes use CD or DVD recordable medium duplicator equipment to make copies of a distributed medium, which duplicated copies can be sold directly or used as pre-masters for creating a new glass master for replication. Hundreds of thousands of pirated optical media can be pressed from a single master with no degradation in the quality of the information stored on the optical media. As consumer demand for optical media remains high, and because such medium is easily reproduced at a low cost, counterfeiting has become prevalent.

A variety of copy protection techniques and devices have been proposed in the art to limit the unauthorized copying of optical media. Among these techniques are analog Color-stripe Protection System (CPS), CGMS, Content Scrambling System (CSS) and Digital Copy Protection System (DCPS). Analog CPS (also known as Macrovision) provides a method for protecting videotapes as well as DVDs. The implementation of Analog CPS, however, may require the installation of circuitry in every player used to read the media. Typically, when an optical medium or tape is "Macrovision Protected," the electronic circuit sends a colorburst signal to the composite video and s-video outputs of the player resulting in imperfect copies. Unfortunately, the use of Macrovision may also adversely affect normal playback quality.

With CGMS the media may contain information dictating whether or not the contents of the media can be copied. The device that is being used to copy the media must be equipped to recognize the CGMS signal and also must respect the signal in order to prevent copying. The Content Scrambling System (CSS) provides an encryption technique to that is designed to prevent direct, bit-to-bit copying. Each player that incorporates CSS is provided with one of four hundred keys that allow the player to read the data on the media, but prevents the copying of the keys needed to decrypt the data. However, the CSS algorithm has been broken and has been disseminated over the Internet, allowing unscrupulous copyists to produce copies of encrypted optical media.

The Digital Copy Protection System (DCPS) provides a method whereby devices that are capable of copying digital media may only copy medium that is marked as copyable. Thus, the optical medium itself may be designated as uncopyable. However, for the system to be useful, the copying device must include the software that respects that "no copy" designation.

While presently available copy protection techniques make it more difficult to copy data from optical media, such techniques have not been shown to be very effective in preventing large-scale manufacture of counterfeit copies. The hardware changes necessary to effectuate many copy protection schemes simply have not been widely accepted. Nor have encryption code protection schemes been found to be fool proof in their reduction of the copying data from optical medium, as data encryption techniques are routinely cracked.

There is a need therefore for a copy-protected optical medium, which does not depend entirely on encryption codes, or special hardware to prevent the copying of the optical medium. Such optical media should also be easily and economically manufactured given the current strictures of optical medium manufacture. The copy-protected media should also be readable by the large number of existing optical medium readers or players without requiring modifications to those devices.

DEFINITIONS

"Authentication Material" refers to a material used to authenticate, identify or protect an optical medium. The data recorded on an optical medium, for example, software, video or audio files, are not authentication material.

"Communication System" refers to any system or network for transferring digital data from a source to a target.

"Light-Changeable Material": a material that absorbs, reflects, emits or otherwise alters electromagnetic radiation directed at the same. By "light-changeable compound" it is meant to include, without limitation, "light-sensitive", "light-emissive" and "light-absorbing" compounds, as defined below.

"Light-Emissive material": a material that emits light in response to excitation with light. Light emission can be a result of phosphorescence, chemiluminescence, or fluorescence. By the term "light-emissive compounds," it is meant to include compounds that have one or more of the following properties: 1) they are a fluorescent, phosphorescent, or luminescent; 2) react, or interact, with components of the sample or the standard or both to yield at least one fluorescent, phosphorescent, or luminescent compound; or 3) react, or interact, with at least one fluorescent, phosphorescent, or luminescent compound to alter emission at the emission wavelength.

"Light-Absorbing Compounds": compounds that absorb light in response to irradiation with light. Light absorption can be the result of any chemical reaction known to those of skill in the art.

"Light-Sensitive Material": a material capable of being activated so as to change in a physically measurable manner, upon exposure to one or more wavelengths of light.

"Non-Destructive Security Dye" refers to a security dye that does not render media permanently unreadable.

"Opacity-Resistant Light-Sensitive Material": a material capable of being activated so as to change in a physically measurable manner, other than in opacity, upon exposure to one or more wavelengths of light. An opacity-resistant light-sensitive material may be said to be reversible when the activated change returns to the initial state due to the passage of time or change in ambient conditions.

"Optical medium": a medium of any geometric shape (not necessarily circular) that is capable of storing digital data that may be read by an optical reader.

"Recording Dye" refers to a chemical compound that may be used with an optical recording medium to record digital data on the recording layer.

"Reader": any device capable of detecting data that has been recorded on an optical medium. By the term "reader" it is meant to include, without limitation, a player. Examples are CD and DVD readers.

"Read-only Optical Medium": an optical medium that has digital data stored in a series of pits and lands.

"Recording Layer": a section of an optical medium where the data is recorded for reading, playing or uploading to a computer. Such data may include software programs, software data, audio files and video files.

"Registration Mark": a physical and/or optical mark used to allow precise alignment between one substrate and another substrate such that when the registration marks are aligned, the corresponding positions on each substrate are known. For example, when two medium are juxtaposed against one another such that their registration marks are aligned, the point on one substrate corresponding to a physical and/or optical deformation on the other substrate is known.

"Re-read": reading a portion of the data recorded on a medium after it has been initially read.

"Reversible Light-Sensitive Material": a light-sensitive material is said to be reversible when the activated change returns to the initial state due to the passage of time or change in ambient conditions.

"Security Dye" refers to a compound that may provide or alter a signal to protect the data on a storage medium.

"Temporary Material" refers to material that is detectable for a limited amount of time or a limited number of readings.

SUMMARY OF THE INVENTION

The present invention provides an optical medium, and a method of manufacturer thereof, that provides copy protection by incorporating a light-changeable compound in or on the optical medium at discrete positions (loci) such that it provides for altering of the digital data output from a section of the recording layer in a predictable manner. Such optical medium permits the data to be read without requiring alteration to the hardware, firmware or software used in optical media readers while preventing reproduction of the medium. The optical media of the present invention provide producers and distributors of digital data with a data distribution medium that prevents reproducing of their digital data, for example, software, audio and video. The present invention particularly relates to read-only optical medium including, but not limited to CD, CD-ROM, DVD, DVD-5, DVD-9, DVD-10, DVD-18 and DVD-ROM, where optical deformations representing the data are introduced permanently into at least a portion of the optical medium prior to distribution to an end-user. As would be understood by one of ordinary skill in the art, however, the present invention may also be used with writable and rewritable optical media such as CD-R and DVD-R.

The present inventors have discovered a method for altering and/or augmenting the optically-read data stored on an optical medium in a manner that does not prevent the underlying data from being read by a conventional optical medium reader, but prevents the production of a useable optical medium copy using such conventional optical medium readers. The present inventors have found that by selectively placing certain reversible light-changeable materials, and in particular light-emissive materials, at discrete positions on an optical medium, that a conventional optical reader can be made at the first pass of such positions to read the data represented by the optical deformations correctly, but on a second pass read the data differently due to the activation of the reversible light-changeable material. That is, the passing light of the reader may be used to influence the compound and change its properties so that upon re-reading, the data signal that is received by the detector is different from that which was received upon initial sampling. For example, the light-changeable compound may become reflective within a timeframe that provides for reflectance of the light beam upon resampling. Alternatively, the light-changeable material may provide for delayed emission or absorbance of light, thereby altering the signal either positively or negatively.

As most optical media readers and players are pre-programmed to re-sample data areas of the recording layer to assure correct copying, optical medium of an embodiment of the present invention will fail to copy, as a data string read from the recording layer will vary according to whether the light-changeable material is activated upon sampling. That is, re-sampling of a data area in proximity to the light-changeable material may result in a different data read than when the data was initially read. Even if a copy can be made, that copy will be invalid if a program on the optical medium requires two different reads to access data on the optical medium. That is, the copy will be invalid since it will only represent one of two possible states at that data locus.

The present invention provides for specific optical media designs, and methods for manufacturing such designs, that incorporate light-changeable materials in a manner that selectively changes the data read-out of the recording layer of an optical medium upon re-sampling of those portions of the recording layer in proximity to the light-changeable material foci. In particular, there is provided optical medium designs that may be easily and economically produced without significantly altering the injection molding manufacturing process of read-only optical media (as set forth above).

In a first embodiment of the present invention there is provided an optical medium having light-changeable material selectively imprinted or placed on the non-impressed (i.e., non-stamped) side of the recording layer of an optical medium. Such medium comprises a first substrate having two major surfaces, a data track disposed along one major surface of the first substrate, and a light-changeable compound disposed on the other major surface of the first substrate cooperating with the data track to alter the data upon excitation with a suitable light stimulus (e.g., a particular wavelength). Such optical medium further preferably comprises a second substrate, preferably of similar optical properties (preferably of the same material), affixedly attached to the surface of the substrate where the light-changeable compound is disposed.

A first embodiment optical medium of the present invention may be produced by disposing the light-changeable material onto the non-impressed side of the substrate after the substrate has been stamped and sufficiently cooled, and after the optical tooling mold is opened (but before the sprue and product eject are brought forward for ejecting the formed optical medium off of the stamper). As would be understood by one of ordinary skill in the art such manufacturing technique permits precise registration of the light-changeable material with the data impressions on the other surface of the substrate. Preferably the light-changeable material is covered by a second substrate of similar (or identical) optical properties to protect the light-changeable material from its ambient environment. Such second substrate may be affixed to the first substrate either before or after the sputtering step used to cover the stamped surface of the first substrate. Either or both of the first and second substrates may be spin-coated with an adhesive agent prior to formation of such optical medium such that the layers may be affixedly attached. Alternatively, the light-changeable material may be coated with a polymer, as by spin-coating. For example, an optically-pure lacquer may be used to coat the light-changeable materials.

In a second embodiment of the present invention, there is provided an optical medium comprising a first substrate layer having a first major surface and a second major surface, said first major surface of said first substrate layer having light-changeable material thereon, and either of said first or second major surface of said first substrate layer, or both, having a registration mark thereon; a second substrate layer having a first major surface and a second major surface, said first major surface of said second substrate layer having information pits thereon, and either of said first or second major surface of said second substrate, or both, having a registration mark thereon, said second major surface of said second substrate being disposed along said first major surface of said first substrate layer such that the registration marks of said first and second substrates are aligned; a metal reflector layer, said metal reflector layer being disposed along said first major surface of said second substrate layer; a first overcoat layer being disposed along said metal reflector layer, and optionally a second overcoat layer being disposed along said second major surface of said first substrate layer.

A second embodiment optical medium may be produced by obtaining a first substrate having a first major surface and a second major surface and a registration mark on either of said first or second major surface, or both; imprinting in discrete positions on said first major surface of said first substrate layer light-changeable material; obtaining a second substrate having a first major surface and a second major surface, and a registration mark on either of said first or second major surface, or both, said first major surface of said second substrate layer having information pits thereon; disposing said second major surface of said second substrate along said first major surface of said first substrate such that the registration marks on said first and second substrate are aligned and affixing said second major surface of said second substrate to said first major surface of said first substrate; metalizing said first major surface of said second substrate layer having said information pits; disposing a first overcoat layer along said metalized surface; and optionally disposing a second overcoat layer along said second major surface of said first substrate layer. As would be understood by one of ordinary skill in the art, the registration marks need not be on the actual surface of a substrate, but need to be detectable. By "a surface having a detectable registration mark" it is meant that a registration mark is detectable therethrough or thereon.

In a third embodiment of the present invention, there is provided an optical medium comprising a substrate having material(s) capable of reacting with one another, or being activated, such that they form a light-changeable material(s) upon exposure to a particular light source of defined energy, such material being coated on the non-impressed (i.e., non-stamped) side of the recording layer of an optical medium. Such optical medium comprises a first substrate, a data track disposed along one surface of the first substrate, and the material(s) capable of being activated to form a light-changeable material(s) upon exposure to a particular light source (of defined energy) coated on the non-embossed surface of the first substrate. For example, a laser may catalyze crosslinking of certain inactive material(s) to form light-changeable compounds, such as a light-emissive material. In this embodiment, the coated material is activated in discrete areas using the appropriate light source (and energy) so as to form a light-changeable material at discrete points which will cooperate by their positioning with respect to the data track to alter the data upon excitation with a suitable light stimulus (e.g., a particular wavelength). This selective activation of various portions of the first substrate to form a light-changeable compound may be performed in a manner similar to that used to write data to a CD-R disc. Such optical medium further preferably comprises a second substrate, preferably of similar optical properties (preferably of the same material), affixedly attached to surface of the substrate where the formed light-changeable compounds are disposed. In an alternative to such embodiment, the material coated on the non-embossed (i.e., non-stamped) side of the recording layer of an optical medium may be light-changeable material that may be selectively deactivated using a laser of particular wavelength and strength. In such case selective activation in the appropriate data spots can be caused by deactivating those portions of the coat which one does not wish to have light-changeable properties.

In a fourth embodiment of the present invention there is provided an optical medium comprising a substrate having two major surfaces, one major surface of the substrate having a data track disposed thereon, and a cohesive layer disposed above such data track, the cohesive layer containing light-changeable material cooperating with data track so as to alter the read of the data stored therein upon excitation with a suitable light stimulus (i.e., activation of the light-changeable material). A preferred optical medium of such embodiment comprises a first molded layer having a data track disposed thereon, a first polymeric layer covering the data track, second polymeric layer comprising the light-changeable material, and a third polymeric layer covering the second polymeric layer. The first polymeric layer may comprise a dielectric layer. The first and second polymeric layers are preferably less than 3 nm in thickness.

In a fifth embodiment, there is provided copy protection in that the optical medium itself has code that instructs the optical reader to re-sample a data area where a light-changeable material is found (or where the light-changeable material affects the read), and to fail to permit the access to the data if upon re-reading the data area, that data elicited is the same as upon initial sampling. In another embodiment, the light-changeable compound must be located at a particular locus for the optical media in operate. For example, software may be included on the optical medium to direct the optical reader to alter its focal length such that the light-changeable material in a plane different from the optical data is detected and access to the optical data permitted only if such light-changeable material is detected.

Yet in a sixth embodiment of the present invention, an optical medium having light-changeable material is formed by selectively placing the light-changeable material into a pit or onto a land of a standard optical medium using microinjection techniques, well known in the art, prior to the metalizing step.

And yet in a seventh embodiment of the present invention, an optical medium having a adhesive material comprising the light-changeable material, said adhesive material being adhered to one or more layer or surfaces of the medium is disclosed. For example, light-changeable material may be placed in a label, or in an optically clear material on a layer or surface of the medium such that the light-changeable material is positioned in the manner desired.

And yet in an eighth embodiment of the present invention there is provided an optical medium comprising a substrate having two major surfaces, a first major surface having a data track disposed thereon, a reflective layer disposed along the data track, and a layer containing light-changeable material disposed over the reflective layer. The data track may comprise a plurality of impressions on the optical medium. The reflective layer may be formed by sputtering of reflective material onto the data track. It is preferred in such embodiment that the reflective layer has one or more holes or punctuate discontinuities therein that permit light which passes through the first major surface to pass therethrough and to impinge on a portion of the light-changeable material layer. The punctuate discontinuities may be formed by any method known in the art, for example by means of a high-powered laser. The light-changeable material may be embedded in the lacquer currently used to seal the optical medium Alternatively, the UV-cured lacquer currently in use may cover the light changeable material. Removal of portions of the reflective layer would allow the reading laser of a conventional optical reader to impinge upon the light-changeable material layer at sites where the reflective layer was removed.

As would be understood by one of ordinary skill in the art, the punctuate discontinuities of such embodiment may be formed in the reflective layer in a planned manner such that on the first read-pass pits and lands (whether correlated with a punctuate discontinuity or not) are read in a conventional manner, but on a subsequent read a pit and/or land associated with a discontinuity in the reflective layer is not read conventionally. For example, a pit associated with a discontinuity in the reflective layer may be read as a pit on the first read, but on subsequent read as a land due to a change in the light-changeable material layer which is detected (due to the discontinuity in the reflective layer) by the reading laser as a change in physical structure of the data track (such as when the light-changeable material emits sufficient light to increase the light received by the reading laser to be above threshold on a subsequent read). A subsequent read may be effectuated by either software or firmware.

While not limited to any particular manufacturing process, optical medium of such embodiment may be manufactured by modification of conventional optical disc manufacture techniques. The medium may be injected molded and metalized as discussed above with respect to the manufacture of conventional read-only optical discs. The disc may then be placed into a glass mastering device or modified CD writer, and select areas of the metalized layer removed to form punctuate discontinuities in the layer. The light-changeable material layer may then be placed, as for example by spin coating, on the non-reading side of the medium such that the light-changeable material layer in a manner such the same would be accessible to the reading laser only through the punctuate discontinuities in the metalized layer. As would be understood by one of ordinary skill in the art, formation of the punctuate discontinuities is preferably performed in a manner such that neither the first read nor any subsequent read after activation of the light-changeable material results in rejection of the data read due to any standard error protocols employed with respect to the medium, such as CIRC and/or EFM.

BRIEF DESCRIPTION OF THE DRAWINGS

The accompanying drawings, which are incorporated in and constitute part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
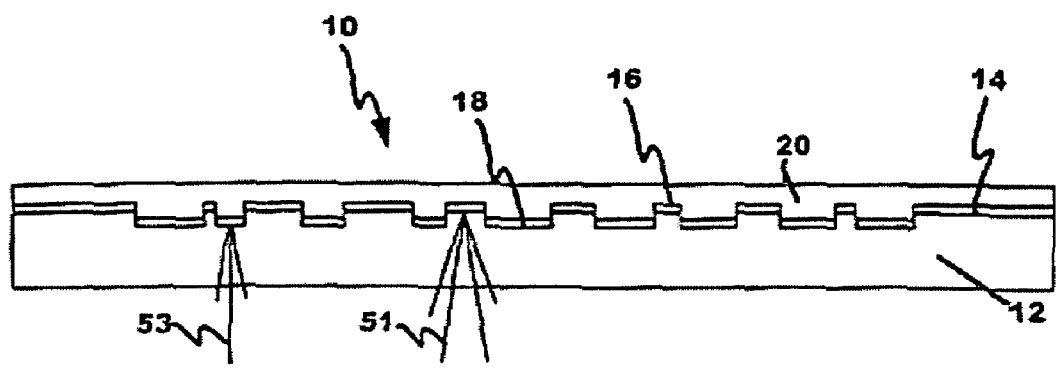
FIG. 1 is a cross-sectional view of a conventional prior art optical storage medium of the type generally referred to as a read-only optical storage disc.

The present invention overcomes many of the problems associated with prior art optical media copy-protection systems. The present invention provides optical media that use certain innate physical properties of the optical medium composition to prevent efficient copying of the optical medium. The invention provides for the altering of digital data output during the reading of such optical media in such a manner that data is allowed to be read while preventing reproduction of the media. Such invention does not require alterations to the hardware, firmware or software used in conventional optical readers. The alteration of data-reads is accomplished by selectively placing light-changeable compounds in the media, such light-changeable compounds preferably reacting upon excitation from the light used by a conventional optical reader. By selective placement of such light-changeable materials, a conventional optical reader may read optically encoded data one way prior to activation of the light-changeable material, and in another manner after activation, and yet in the first manner when the light-changeable materials are no longer activated.

As would be understood by one of ordinary skill in the art, a transition from a land to a pit, or pit to a land, is conventionally interpreted by a standard optical reader as a "1". However, if a pit is in the midst of other pits, or a land is in the midst of other lands, a "0" will be registered. By selectively placing light-sensitive material with respect to the pits and lands, one can affect the read of the data. For example, given a land of length 3T immediately preceding a pit of length 6T that is followed by a land of 3T, a conventional optical disc reader would read a data stream of 00100000100, where each transition from a pit to a land is read as a "1". If a light changeable material is readable by a reader over a 3T length of the 6T pit upon a subsequent read, the data stream may be read instead as 00000100100. That is, the transitions can be moved by causing the reader to detect a transition from a pit to land, or vice versa, wherein no physical transition actually exists.

The light-changeable material may be selectively placed in register with the data pits and lands and the checksums set on the optical medium take into account the changeable data strings such that the Cross-Interleave Reed-Solomon Code ("CIRC") decoder (standard on all CD players/readers) does not detect a read error preventing the underlying data from being read. Up to three percent of demodulated incoming frames from the reading laser can be corrected by an enhanced CIRC decoder. Both the data represented by the pits and lands, and the data represented by the light-changeable material may need to be decoded to correct data strings by the CIRC decoder. Alternatively, the light-changeable material may be placed in a separate layer planar to the injection molded data without regard to registry.

When the two different data sets readable from the locus are used to cause proper read of the optical medium (e.g., when a software instruction set on the optical medium or elsewhere requires two different data reads at a locus for proper functioning), it may be preferred that the light-changeable materials employed exhibit long term stability under typical optical media storage conditions and that the light-changeable materials be light fast and non-reactive permitting the optical medium to be used over a long period of time. On the other hand, it may be preferred in some applications that the chosen light-changeable material degrade over a period of time such that the optical medium can be read only over a limited time period as, for example, with demonstration discs.

Demonstration discs are often provided to consumers to entice them into buying a full-fledged release of the product. Demonstration discs are often packaged to provide limited functionality (i.e., not allowing all aspects of the fully functioning software to be executed) and/or contain instruction sets that limit the number of times that the disc can be employed by the user. The present invention provides advantage over such demonstration discs in that a demonstration disc employing teachings of the present application could be made to be fully functional, and yet designed to lack functionality after a period of time or after a number of uses, without need to resort to purely (possibly hackable) software means to effectuate the same.

Light-changeable compounds may be chosen from any compound or combination of compounds that serve to change the output signal from the medium upon re-reading. These compounds include, without limitation, delayed emission compounds, delayed absorbance compounds and other light-changeable compounds. A layer in the medium that becomes reflective upon re-reading may also be useful in predictably altering the output of the medium.

The light-changeable compounds of the present invention may be either organic or inorganic in nature, a combination of both, or mixtures thereof. The compounds preferably demonstrate delayed response to the wavelength(s) of light to which they are sensitive, such that the data can be read by the reader in at least a first intended form upon initial read, and upon re-sampling in at least a second intended form.

In a preferred embodiment the light-changeable compounds are compounds capable of light-emission upon stimulation with one or more wavelengths of light. Preferably the light-emissive light-changeable compounds emit at wavelengths that are in the same, or about the same, as the wavelengths that are detected by the readers. For example, with a CD it is preferred that the light-changeable compound emit at a wavelength of about 780 nm and with a DVD that the light-changeable compound emit at a wavelength of about 650 nm.

As stated above, the light-changeable compounds may be organic in nature, as for example, a dye. A particularly useful class of organic dyes of the present invention is the cyanine dyes. These cyanine dyes include, among others, indodicarbocyanines (INCY), benzindodicarbocyanines (BINCY), and hybrids that include both an INCY and a BINCY. Hybrids may be, for example, mixtures of two different dyes or, in another embodiment, compounds that include both INCY and BINCY moieties. In one embodiment, the light-changeable compound is a ratiometric compound having a linked structure with excitation ranges at both the CD and DVD ranges of about 530 and 780 nm. In a further embodiment, the dye is phosphorescent, having a time delay of about 10 milliseconds.

Table 1 provides some organic dyes that may be useful with the invention.

TABLE 1

| Dye Name/No. | CD/DVD | Excitation | Emission |
| --- | --- | --- | --- |
| Alcian Blue (Dye 73) | DVD | 630 nm | Absorbs |
| Methyl Green (Dye 79) | DVD | 630 nm | Absorbs |

TABLE 1-continued

| Dye Name/No. | CD/DVD | Excitation | Emission |
|---|---|---|---|
| Methylene Blue (Dye 78) | DVD | 661 nm | Absorbs |
| Indocyanine Green (Dye 77) | CD | 775 nm | 818 nm |
| Copper Phthalocyanine (Dye 75) | CD | 795 nm | Absorbs |
| IR 140 (Dye 53) | CD | 823 nm (66 ps) | 838 nm |
| IR 768 Perchlorate (Dye 54) | CD | 760 nm | 786 nm |
| IR 780 Iodide (Dye 55) | CD | 780 nm | 804 nm |
| IR 780 Perchlorate (Dye 56) | CD | 780 nm | 804 nm |
| IR 786 Iodide (Dye 57) | CD | 775 nm | 797 nm |
| IR 768 Perchlorate (Dye 58) | CD | 770 nm | 796 nm |
| IR 792 Perchlorate (Dye 59) | CD | 792 nm | 822 nm |
| 1,1'-DIOCTADECYL-3,3,3',3'-TETRAMETHYLINDODICARBOCYANINE IODIDE (Dye 231) | DVD | 645 nm | 665 nm |
| 1,1'-DIOCTADECYL-3,3,3',3'-TETRAMETHYLINDO TRICARBOCYANINE IODIDE (Dye 232) | DVD | 748 nm | 780 nm |
| 1,1',3,3,3',3'-HEXAMETHYL-INDODICARBOCYANINE IODIDE (Dye 233) | DVD | 638 nm | 658 nm |
| DTP (Dye 239) | CD | 800 nm (33 ps) | 848 nm |
| HITC Iodide (Dye 240) | CD | 742 nm (1.2 ns) | 774 nm |
| IR P302 (Dye 242) | CD | 740 nm | 781 mm |
| DTTC Iodide (Dye 245) | CD | 755 nm | 788 nm |
| DOTC Iodide (Dye 246) | DVD | 690 nm | 718 nm |
| IR-125 (Dye 247) | CD | 790 nm | 813 nm |
| IR-144 (Dye 248) | CD | 750 nm | 834 nm |

As also stated above, the light-changeable compounds may also be inorganic in nature. Inorganic compounds find particular use in the present invention when the light-changeable material is desired to be functional for long periods of time on the optical medium. Inorganic compounds are less prone to degrade when exposed to repeated laser challenges.

Inorganic compounds capable of light-emission may find use in the present invention. Compounds such as zinc sulfide (ZnS) at various concentrations (Seto, D. et al., *Anal. Biochem.* 189, 51-53 (1990)), and rare earth sulfides and oxysulfides, such as, but not limited to, ZnS—$SiO_2$, $Zn_2SiO_4$, and $La_2O_2S$ are known to be capable of emitting phosphorescence at certain wavelengths. Such inorganic light-emissive compounds may be used advantageously with a metal ion such as manganese (Mn), copper (Cu), europium (Eu), samarium (Sm), $SmF_3$, terbium (Th), $TbF_3$, thulium (Tm), aluminum (Al), silver (Ag), and magnesium (Mg). Phosphorescent and luminescent properties of the compounds can be altered in a ZnS crystal lattice, for example, the delay time and wavelength of emission be controlled by changing the metal ions used for binding (See, e.g., U.S. Pat. No. 5,194,290).

Inorganic phase change materials can also be used to effectuate the present copy protection invention. Particularly useful inorganic phage change materials include chalcogenide materials such as GeSbTe, InSbTe, InSe, AsTeGe, $TeO_x$—GeSn, TeSeSn, SbSeBi, BiSeGe and AgInSbTe-type materials which can be changed from an amorphous state to a crystalline state by absorption of energy from particular light sources. The phase change should be timed such that the data underlying the phage change material can be read before the change occurs. The phase change should also be persistent enough that upon re-sampling a different data read is obtained, and yet not too persistent such that the underlying data is obfuscated for significant periods of time. Software on the optical medium should be keyed to the period of time involved in the change of phase and return to original phase. In a preferred embodiment the transition from amorphous to crystalline state should not last more encompass more than about 300 msec. Multiple reads in the same spot can be used to induce a temperature change, as can laser pumping, causing phase change activation at a specific point or locus.

The inorganic compound(s) may be used in numerous forms as would be understood by one of ordinary skill in the art, including, without limitation, in very fine particle size, as dispersions or packed within a crystal lattice (See, e.g., Draper, D. E., *Biophys. Chem.* 21: 91-101 (1985)).

Given that the pit size on a typical CD ROM is 0.8 µm, and on a typical DVD 0.4 µm, it is preferred that the inorganic or organic light-changeable materials used in the present invention be smaller than the respective pit sizes.

In conventional "read only" type optical media, the light-changeable material may be placed at the pit and/or land level, or in register therewith, such that, for example with respect to a delayed light-emissive material, a pit may be read as a land when re-sampling of the data occurs and the light-changeable material emits light. In writable or recordable optical media the light-changeable material is preferably placed in the phase change layer in a manner to interfere with the read of the substrate change in the manner such change is otherwise intended to be read.

Numerous methods may be used to allow for the precise placement of the light-changeable material with respect to the data structure (i.e., the pit, land, deformation, etc. read as data) that is desired to be obscured upon activation of the light-changeable material. For example, the light-changeable material may be formulated with an uv cure resin or other photoinitiator which is able to effectuate a cure in the wavelengths associated with readers (400-800 nm) or in the UVA, UVB and UVC range (254 nm-365 nm) and placed as a layer over the optical medium. A laser beam of appropriate wavelength may be used to cure the resin at a precise point on the optical medium and the remaining uv cure resin washed off. A photomask may be used to pin point the cure on the optical medium. In such a technique, the light-changeable material is placed in a light sensitive film, which is laid on the optical medium. The photomask is used to allow directed cure of the film by permitting curing light to pass through the photomask at certain positions thereby placing the light-changeable material in the desired positions on the optical medium. Alternatively, quantum dots or nanocrystals (Peng et al. *J. Am. Chem. Soc.* 119: 7019 7029 (1997), or fluorescent microspheres (such as Fluospheres available form Molecular probes, Oregon, USA) can be used for precise placement on the optical medium. Such micromaterials may be placed in discrete positions by, for example, using lithographic process such as photomasking. As Fluosphere beads can be made from 0.2 µm-4.0 µm in size, such spheres may be placed at the pit level.

Instead of direct registration of the light-changeable material with a pit, land or other data structure, that is the content data, the light-changeable material may be placed in a separate layer planar to the injection molded data without regard to registry.

The light-changeable material may also be placed on the optical medium in a bound spin-coat rather than specifically placed in discrete points or localities. Preferably, in such case, the spin-coat is uniform in thickness. The thickness of the light-changeable material layer in such embodiment may be controlled by varying, among other factors, the rotational speed of the media during the spin coat process. The thickness of the layer will vary according to the application, but is generally between about 160 nm to less than 1 nm thick. The desired thickness of the layer comprising the light-changeable material may vary according to the absorption of the material, the emission of the material, the density of the material and the structure of the media, as well as the properties of the reader that is used to read the data off of the media. It is typically preferred that the light-changeable material layer be applied at a thickness that is thin enough to allow transmission of light to adequately read the underlying data upon initial sampling, while being dense enough to provide adequate change, such as light emission, upon oversampling with the same reader. For many applications a film thickness of from 50 to 160 nm is found useful. For most CDs the film thickness is in the range of from about 70 nm to about 130 nm, while for most DVD the film thickness is preferably in the range of from about 50 nm to about 160 nm.

As would be understood by one of ordinary skill in the art, the persistence of the activated state of the light-changeable material, such as a light-sensitive material, (i.e., the length of time the material is in the activated state versus initial state) and the delay in the conversion of the initial state to the activated state (i.e., the length of time it takes the material to enter the activated state from the initial state) are important to permit the proper read of the underlying data, and for causing a change in the data read upon re-sampling. Given a pit size of 8 µm, and a typical rotational speed of 1.2 m/sec in a CD-ROM, the preferred delay in a CD is a minimum of about $6.85 \times 10^{-7}$ seconds. Given a pit size of 0.4 µm, and a rotational speed of about 3.5 m/sec in a DVD, the preferred delay in a DVD is a minimum of about $1.14 \times 10^{-7}$. If the delay is too quick the data below the light-changeable material will be obscured prior to read.

The rotational speed, that is the time it takes for a reader to get back to the same area on the optical medium, differs for conventional CDs and DVDs. The persistence of the activated state should at least last this long. Given a 120 mm diameter and a rotational speed of about 1.2 m/sec, the light-changeable material placed on a CD should display a persistence of at least about 300 msec. Given a 120 mm diameter, and a rotational speed of about 3.5 m/sec, the light-changeable material placed on a conventional DVD should display a persistence of at least about 100 msec. If the persistence is too short, the activated state will not be seen to obscure the underlying data upon re-sampling. Of course, if persistence is too long it may not allow the data on the optical medium to be read in an acceptable time after activation of the light-changeable material. Persistence of certain inorganic light-changeable materials, such as zinc sulfide, can be controlled by altering the particle size, or by inserting certain metals or ions in a lattice of zinc sulfide (ZnS) or a crystal lattice of $ZnS-SiO_2$, for example persistence of fluorescence of ZnS can be altered by doping it with different metals or ions such as Eu, Sm Tb, Cu, Mn, Al, and Mg at various concentrations.

It is generally preferred that the particle size be less than 100 nm, more preferably less than 10 nm, and no more than the pit size of the optical medium being read (about 0.8 µm for the conventional CD, and about 0.4 µm for the conventional DVD). The light-changeable material should be placed on the optical medium in a manner that the coating is not so thick as to cause scatter and incoherence. Preferably, any coating of the light-changeable material should be less than 100 nm. When the light-changeable material changes reflectivity upon activation, the minimum change in the index of refraction on a pit/land based optical medium should be at least about 0.3 to 0.4 to correspond to the change in index of refraction between a pit and a land.

The present invention may be used with conventional optical media such as CDs and DVDs. The invention may also be incorporated into mass production techniques that are currently used to produce "read-only" CDs and DVDs, and hybrid read-only/recordable or rewritable data forms, and other physical optical medium formats, with minimal changes in the production equipment and line. As would be understood by one of ordinary skill in the art, the present invention may also be employed with recordable or rewritable data forms, albeit, more changes in the production equipment may be required.

Now turning to the figures, there is shown in FIG. 1 a cross-sectional view of a prior art read-only optical storage medium 10 for storing pre-recorded data in a manner that can be read by a radiation beam interacting with the medium. A transparent polycarbonate substrate layer 12, or similar material having an optical transmission characteristic which permits the radiation interacting with the recording layer to be transmitted therethrough. An aluminum reflector layer 14 is found adjacent to polycarbonate substrate layer 12. Polycarbonate layer 12 is fabricated with the data stored as surface structure, illustrated as lands 16 and pits 18. Aluminum reflector layer 14 is disposed in such a manner as to provide a surface generally retaining the structure of the polycarbonate surface. A protective overcoat layer 20 is applied to aluminum reflector layer 14 in an uncured state and is cured by ultraviolet radiation. Also shown in FIG. 1 are the laser beam interaction with a position on a pit (51), and the laser beam interaction at a land (53).

Figure 5:
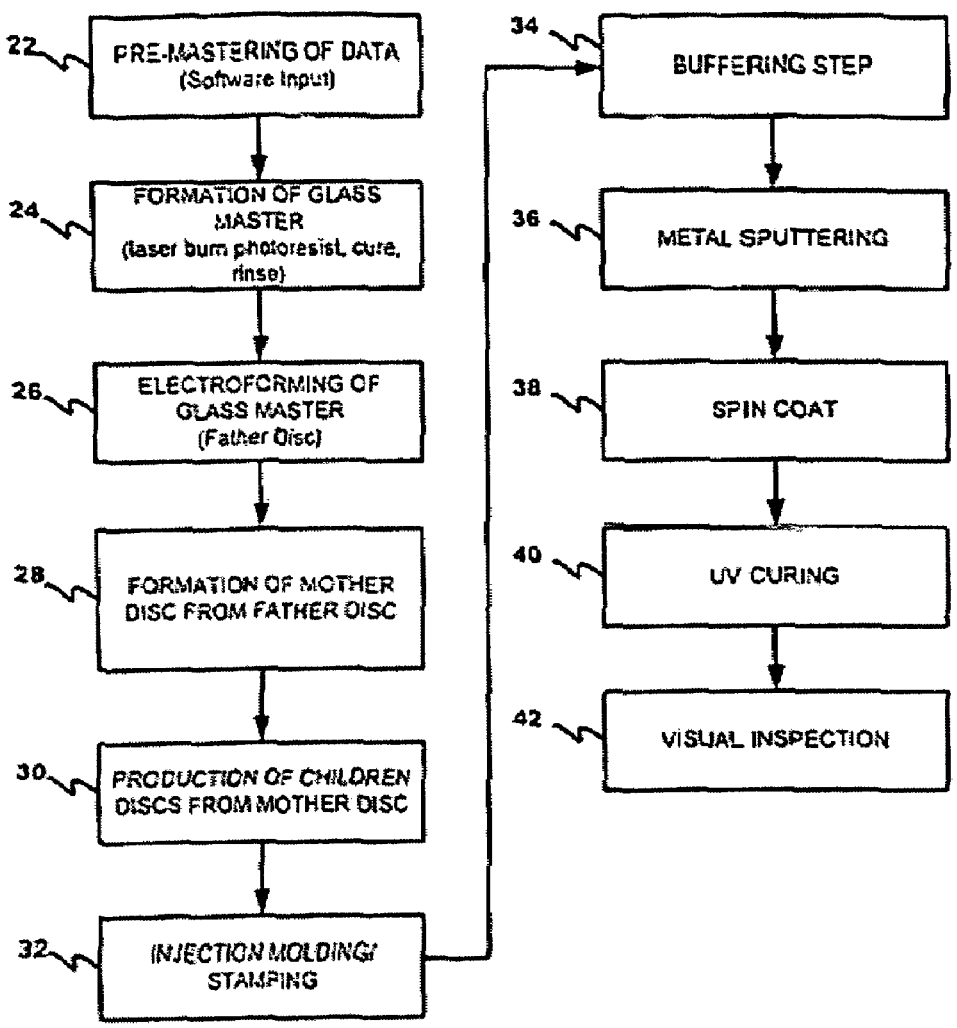
FIG. 5 is a diagrammatic flow chart of a conventional prior art injection molding technique for manufacturing read-only optical media.

FIG. 5 is a diagrammatic flow chart of a conventional prior art injection molding technique for manufacturing read-only optical media. Manufacture of an optical medium begins with premastering 22 (formatting) of the data. The premastered data is used to control a laser used in the glass mastering step 24 to remove photoresist material from a photoresist coated glass plate. The photoresist material is burnt by the laser, the photoresist is cured and unexposed photoresist rinsed off, and the resulting data-bearing glass master is then electroformed with a metal such as Ag or Ni (step 26) to form a father, in the case of a disc, known as the "father disc." The father disc may be used as a template to make a mirror image disc, known in the art as the mother disc (step 28). Mother disc is used to make optical duplicates of the father disc (step 30), such discs being referred to as children discs. Children discs are referred to as stampers when used to produce multiple discs in an injection molder. If an entire disc "family" is not created, the father disc may be used directly as the stamper.

The injection molding step 32 uses a stamper to form deformations in the manufactured discs representative of the premastered data of premastering step 22. The manufactured optical media are then removed from the mold and allowed a cool down period, known in the art as the buffering step 34. The surface of the polycarbonate substrate carrying the deformations is coated with metal in metal sputtering step 36. In metal sputtering step 36 metal is coated over and within the deformations to form a metal layer over the polycarbonate substrate. Both the metal layer and the non-metalized polycarbonate substrate surfaces are coated with a protective polymer, typically lacquer, in spincoat step 38. The spincoated layers are then cured at UV curing step 40. The optical media are then inspected at visual inspection step 42 and the optical media are approved or rejected.

Figure 2:
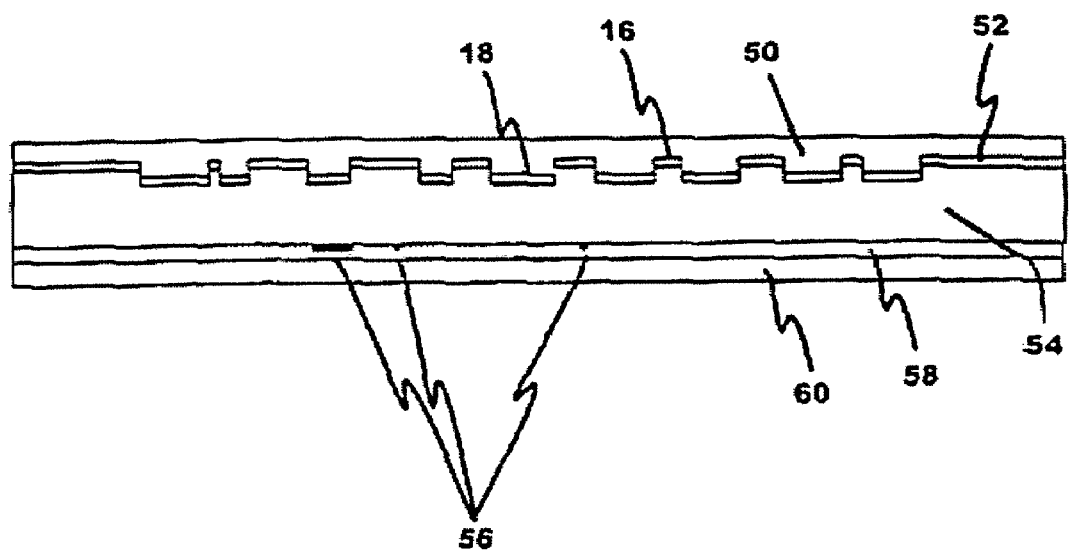
FIG. 2 is a cross-sectional view of an exemplary optical storage medium of the present invention.
Figure 6:
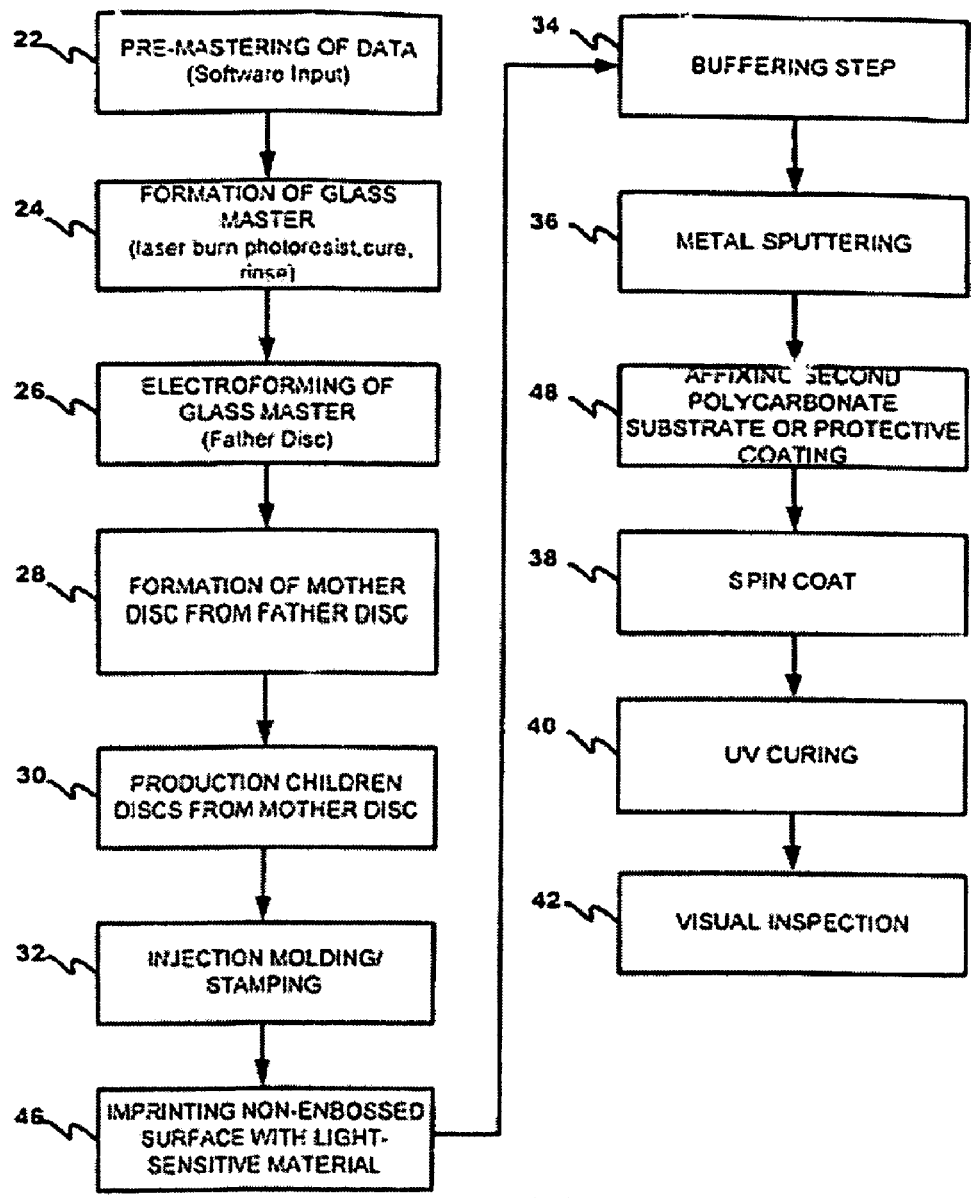
FIG. 6 is a diagrammatic flow chart of a preferred method of the present invention for manufacturing read-only optical media with minor modification to the conventional injection molding for manufacturing read-only optical media of the type set forth in FIG. 2.

FIG. 6 is a diagrammatic flow chart of a preferred method of the present invention for manufacturing read-only optical media with minor modification to the conventional injection molding for manufacturing read-only optical discs of the type set forth in FIG. 2. As seen in the flow chart, additional steps 46 and 48 are added to the conventional method set forth in FIG. 5. Light-changeable material is imprinted at step 46 on the surface of the mold which is not impressed with the child disc (i.e., the stamper) while the stamper is still in contact with the molding material, after the molding material has sufficiently cooled so as not to damage the light-changeable properties of the material, and before the molded substrate is removed from the molding apparatus. Imprinting may be done, for example, using gravure, laser printing, Mylar screen-printing, drop-on-demand printing, CIJ or other methods known in the art for imprinting materials. The resulting optical medium is treated as set forth above in FIG. 5, with the additional step 48 of adding a second polycarbonate substrate or protective layer over the surface imprinted with the light-changeable material to protect such material for the ambient environment. FIG. 2 is a cross-sectional view of an exemplary optical storage medium manufactured by such technique comprising spin coat layers 50, metalized layer 52, impressed polycarbonate layer 54, light-changeable material 56, bonding material layer 58, second polycarbonate layer 60.

Figure 3:
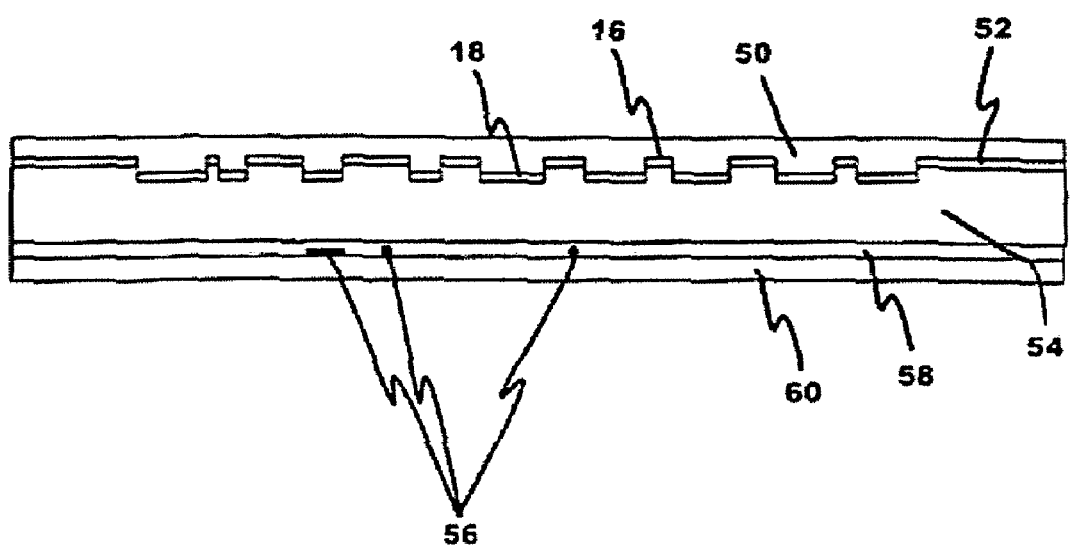
FIG. 3 is a cross-sectional view of an another exemplary optical storage medium of the present invention.
Figure 7:
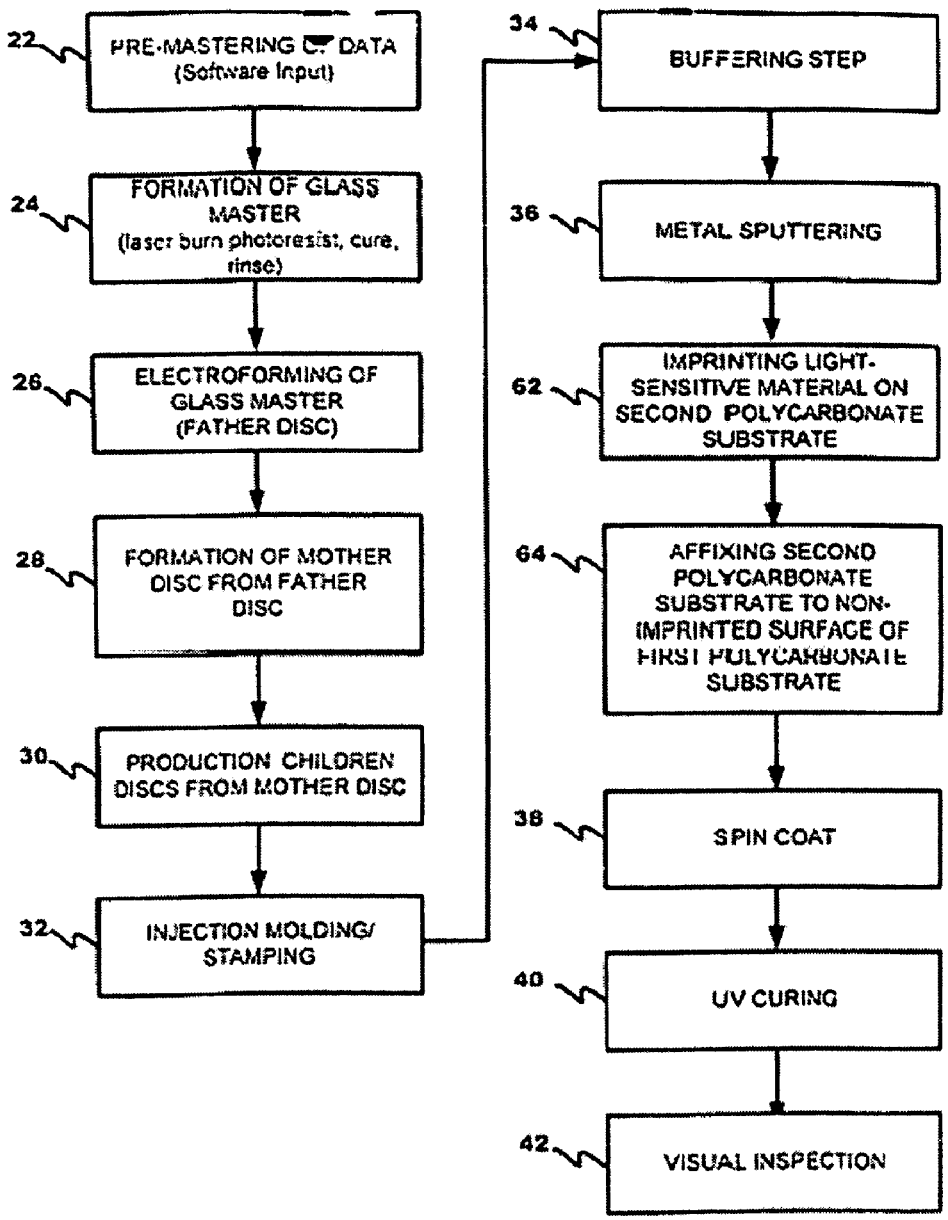
FIG. 7 is a diagrammatic flow chart of a preferred method of the present invention for manufacturing read-only optical media with minor modification to the conventional injection molding for manufacturing read-only optical media of the type set forth in FIG. 3.

Now turning to FIG. 7 is a diagrammatic flow chart of a preferred method of the present invention for manufacturing read-only optical medium with minor modification to the conventional injection molding for manufacturing read-only optical media of the type set forth in FIG. 3. The flow chart of FIG. 7 differs from that of the conventional technique for manufacturing read-only optical media of FIG. 5, in including step 62 wherein light-changeable material is printed onto a second polycarbonate material. As would be apparent to one of ordinary skill in the art, step 62 can be concurrent with, prior to, or after the injection molding of the first substrate. Second polycarbonate substrate is affixed to the metalized polycarbonate medium having the information pits at step 64, which also may be performed other stages in the technique as would be understood by one of ordinary skill in the art. For example, the first substrate may be metal sputtered at the same time that the light-changeable material is being imprinted on the second substrate. Attachment of the second polycarbonate substrate may be means of a hot melt or by way of bonding materials. FIG. 3 is a cross-sectional view of an exemplary optical storage medium manufactured by such technique comprising spin coat layers 50, metalized layer 52, impressed polycarbonate layer 54, light-changeable material 56, bonding material layer 58, second polycarbonate layer 60.

Figure 4:
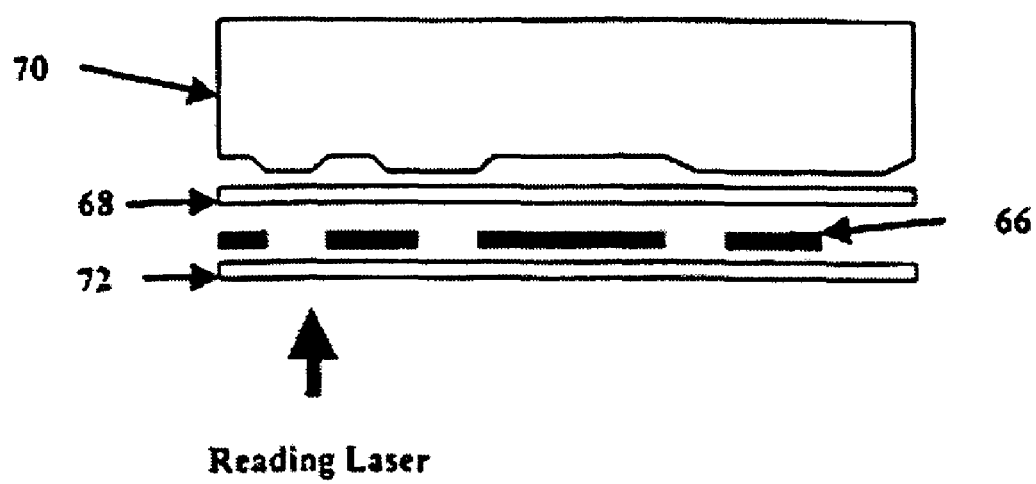
FIG. 4 is a cross sectional view of an optical storage medium wherein the photosensitive material is located in a layer separate from the content data.

FIG. 4 a cross sectional view of yet another optical storage medium of the present invention wherein the photosensitive material is located in a layer 66 separate from the content data. The photosensitive material may be printed on layer 66 by, for example, an ink jet printer. The optical medium of FIG. 4 may be produced after UV curing step 40 of FIG. 5 in that the light-sensitive material layer 66 may be placed on top of the spin coated lacquer layer 68, that sits atop of the data bearing injection molded layer 70. Another spin-coated lacquer layer 72 is shown in the figure to overlie layer 66, to protect such against damage.

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

We claim:

1. An optical recording medium readable by an optical reader, said optical recording medium having optical data structures thereon, said optical recording medium comprising an light-changeable material selectively positioned with respect to at least a portion of the optical data structures, and containing instructions for controlling the optical reader to cause the optical reader to detect the position(s) of the light-changeable material on the optical data structure and for permitting access to the read of the optical data structures only if the position(s) of the light-changeable material with respect to the optical data structures is in accord with reference position(s).

2. An optical recording medium in accordance with claim 1 wherein the light-changeable material is a reversible light-changeable material.

3. An optical recording medium in accordance with claim 1 wherein said instructions further direct the optical reader to alter its focal length to detect the light-changeable material.

4. An optical recording medium in accordance with claim 1 wherein the light-changeable material is in a plane different from the optical data structure.

5. An optical recording medium in accordance with claim 1 wherein the instructions further comprising directions for the optical reader to re-read the position(s) at which said light-changeable material is detected.

* * * * *